United States Patent
Ohashi et al.

(10) Patent No.: US 10,008,883 B2
(45) Date of Patent: Jun. 26, 2018

(54) NOISE REDUCING POWER FEED DEVICE, POWER RECEPTION DEVICE AND POWER FEED METHOD

(71) Applicant: Panasonic Intellectual Property Management Co., Ltd., Osaka (JP)

(72) Inventors: Osamu Ohashi, Kanagawa (JP); Tsuyoshi Nishio, Chiba (JP); Noriaki Asaoka, Kanagawa (JP); Masayoshi Koizumi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 14/897,522

(22) PCT Filed: Jun. 23, 2014

(86) PCT No.: PCT/JP2014/003343
§ 371 (c)(1),
(2) Date: Dec. 10, 2015

(87) PCT Pub. No.: WO2015/001758
PCT Pub. Date: Jan. 8, 2015

(65) Prior Publication Data
US 2016/0141919 A1   May 19, 2016

(30) Foreign Application Priority Data
Jul. 1, 2013  (JP) .................................. 2013-137965

(51) Int. Cl.
*H02J 7/00* (2006.01)
*H02J 50/12* (2016.01)
(Continued)

(52) U.S. Cl.
CPC ............. *H02J 50/12* (2016.02); *B60L 11/182* (2013.01); *B60L 11/1838* (2013.01);
(Continued)

(58) Field of Classification Search
CPC .. H02J 50/12; H02J 50/80; H02J 5/005; H02J 7/00; H02J 17/00; B60L 11/182;
(Continued)

(56) References Cited

U.S. PATENT DOCUMENTS 5,539,318 A * 7/1996 Sasaki .............. G01R 19/16542
324/427
2009/0085522 A1   4/2009 Matsumoto
(Continued)

FOREIGN PATENT DOCUMENTS

JP    2010-239690    10/2010
JP    2011-125184    6/2011
(Continued)

OTHER PUBLICATIONS

International Search Report of PCT application No. PCT/JP2014/003343 dated Sep. 16, 2014.
(Continued)

*Primary Examiner* — Yalkew Fantu
*Assistant Examiner* — Mohammed J Sharief
(74) *Attorney, Agent, or Firm* — Pearne & Gordon LLP

(57) ABSTRACT

Power feed device (100) supplies power to storage battery (152) mounted on vehicle (150), through power receiving unit (154) of vehicle (150). Power supply unit (104) performs preliminary supply to power receiving unit (154) while sequentially changing a frequency, and performs main supply with power larger than in the preliminary supply. Power supply-side controller (103) acquires frequency characteristics associated with power supply coil (104a), and specifies a resonance frequency based on the acquired
(Continued)

frequency characteristics. Power supply-side controller (103) determines whether or not to supply power to power reception coil (154a) based on a frequency difference between resonance frequencies.

14 Claims, 11 Drawing Sheets

(51) Int. Cl.
| | |
|---|---|
| *H02J 7/02* | (2016.01) |
| *H02J 17/00* | (2006.01) |
| *B60L 11/18* | (2006.01) |
| *H02J 50/80* | (2016.01) |
| *H02J 5/00* | (2016.01) |

(52) U.S. Cl.
CPC ............... *H02J 5/005* (2013.01); *H02J 7/00* (2013.01); *H02J 7/025* (2013.01); *H02J 17/00* (2013.01); *H02J 50/80* (2016.02); *B60L 2270/147* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC ........... B60L 11/1838; B60L 2270/147; Y02T 10/7005; Y02T 10/7072; Y02T 90/121; Y02T 90/122; Y02T 90/128; Y02T 90/14; Y02T 90/163
USPC ........................................................ 320/108
See application file for complete search history.

(56) References Cited

U.S. PATENT DOCUMENTS

| | | | |
|---|---|---|---|
| 2010/0244577 A1* | 9/2010 | Shimokawa | B60L 11/182 307/104 |
| 2010/0244578 A1* | 9/2010 | Yoshikawa | H02J 5/005 307/104 |
| 2011/0127956 A1* | 6/2011 | Mitsutani | B60K 6/365 320/109 |
| 2011/0270462 A1* | 11/2011 | Amano | H02J 5/005 700/297 |
| 2011/0316553 A1* | 12/2011 | Taguchi | B60L 3/00 324/500 |
| 2012/0119713 A1* | 5/2012 | Horita | H02P 9/48 322/23 |
| 2012/0242286 A1* | 9/2012 | Takada | B60L 11/182 320/108 |
| 2012/0256589 A1* | 10/2012 | Ichikawa | B60L 11/1803 320/111 |
| 2013/0057082 A1 | 3/2013 | Takada et al. | |
| 2014/0103871 A1 | 4/2014 | Maikawa et al. | |
| 2014/0239728 A1 | 8/2014 | Yamakawa | |

FOREIGN PATENT DOCUMENTS

| | | |
|---|---|---|
| JP | 2011-142769 | 7/2011 |
| JP | 2012-065477 | 3/2012 |
| JP | 2012-249400 | 12/2012 |
| WO | 2012/132413 A1 | 10/2012 |
| WO | 2012/165242 | 12/2012 |

OTHER PUBLICATIONS

Extended European Search Report issued in Application No. EP 14 81 9391 dated Jun. 20, 2016.
The Communication pursuant to Article 94(3) EPC dated Nov. 22, 2017 for the related European Patent pplication No. 14819391.5.

* cited by examiner

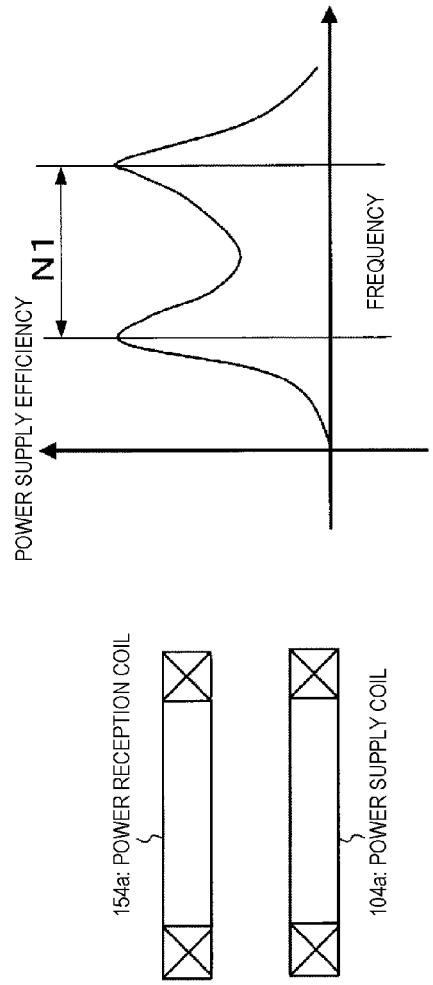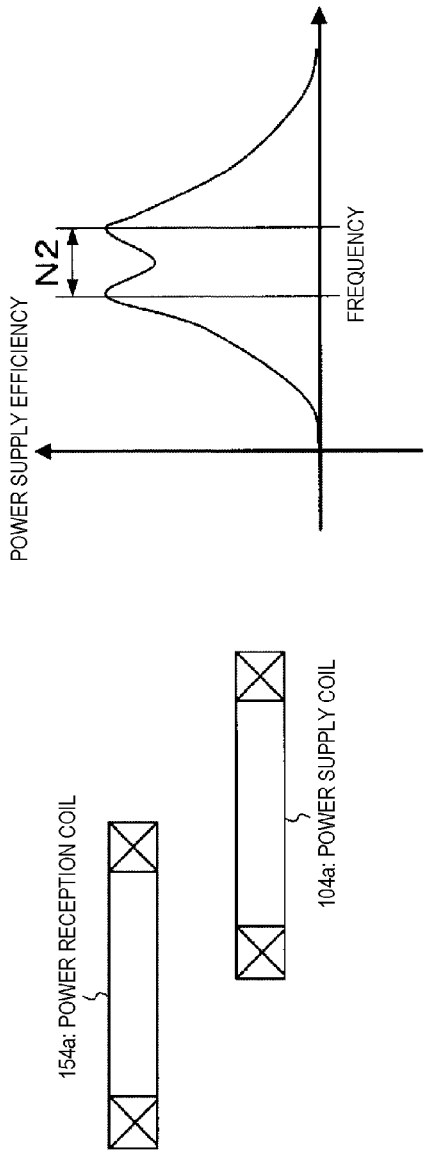

FIG. 8

| ACCUMULATED POWER Wb RELATIVE TO FULL CHARGING OF STORAGE BATTERY 152[%] | $0 \leq Wb < 80$ | $80 \leq Wb < 85$ | $85 \leq Wb < 90$ | $90 \leq Wb < 95$ | $95 \leq Wb \leq 100$ |
|---|---|---|---|---|---|
| CORRECTION FACTOR | 1 | 0.95 | 0.9 | 0.85 | 0.8 |

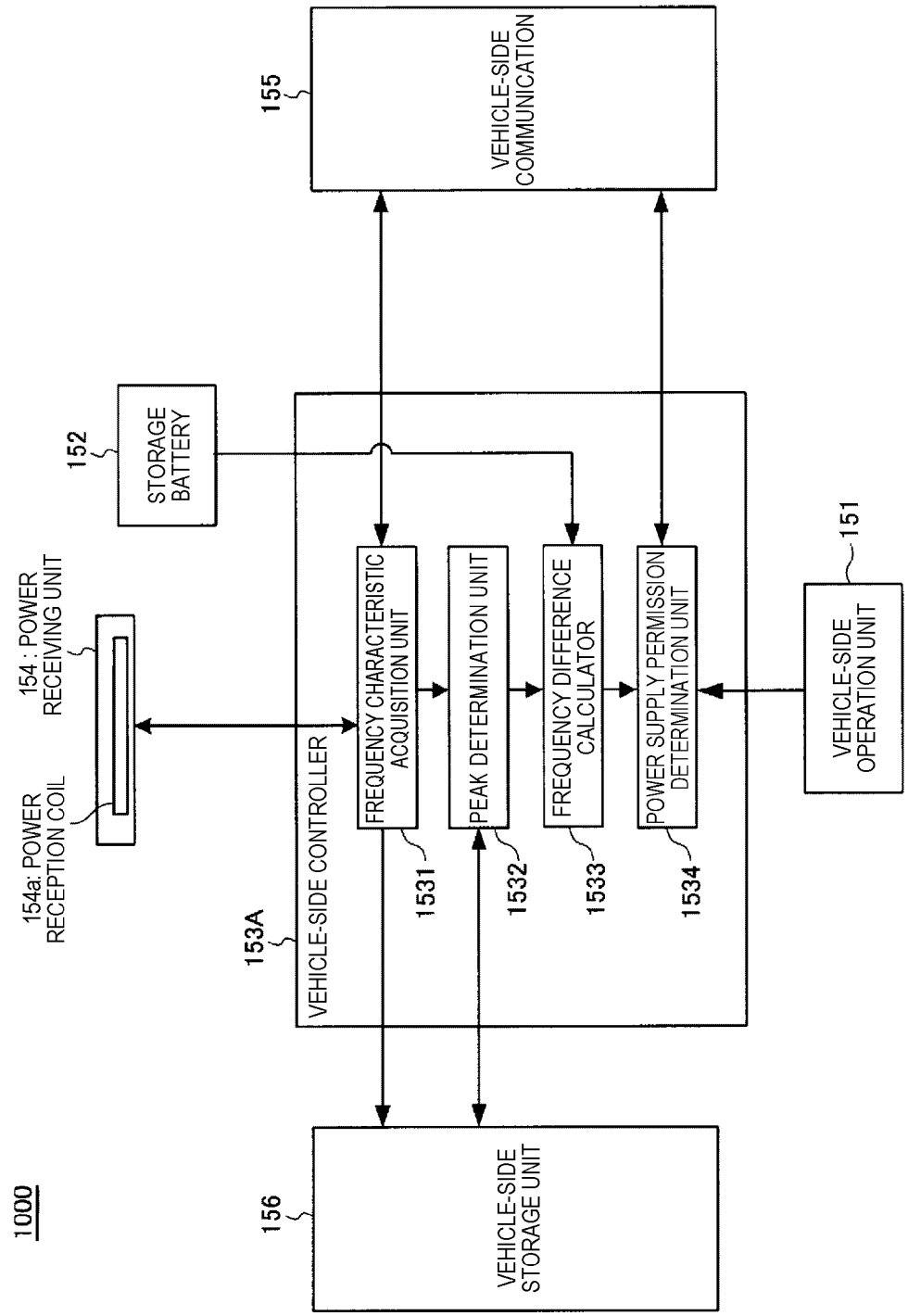

ated with the power supply coil; a resonance frequency specifying unit that specifies a plurality of resonance frequencies, based on the frequency characteristics; and a power supply controller that determines whether or not to supply power to the power reception coil, based on a frequency difference between the plurality of resonance frequencies.

NOISE REDUCING POWER FEED DEVICE, POWER RECEPTION DEVICE AND POWER FEED METHOD

CROSS-REFERENCE TO RELATED APPLICATIONS

This application is a U.S. national stage application of the PCT International Application No. PCT/JP2014/003343 filed on Jun. 23, 2014, which claims the benefit of foreign priority of Japanese patent application 2013-137965 filed on Jul. 1, 2013, the contents all of which are incorporated herein by reference.

1. FIELD OF THE INVENTION

The present invention relates to a power feed device that supplies power to a storage battery mounted in a vehicle through a power receiving unit of the vehicle.

DESCRIPTION OF THE RELATED ART

In the related art, a wireless charging system has been known which charges a storage battery mounted on a vehicle by using a power feed device on the ground. It is preferable to supply power with high supply efficiency in order to suppress wasteful power consumption in the wireless charging system.

In the related art, a wireless charging system has been known which determines a frequency at which power is the maximum and supplies power in order to achieve high power supply efficiency, when a distance between a power supply coil and a power reception coil varies (for example, PTL 1). In PTL 1, a power feed device determines a frequency at which reception power is the maximum by sequentially changing the frequency of power to be supplied from a power supply coil, and performs power supply at the determined frequency. Thus, the wireless charging system of PTL 1 can efficiently realize wireless power transmission.

CITATION LIST

Patent Literature

PTL 1; Japanese Patent Unexamined Publication No. 2011-142769

SUMMARY OF THE INVENTION

However, in PTL 1, since the maximum power is set and power supply is performed even in a state where positional deviation occurs between the power supply coil and the power reception coil, there is a problem in that unnecessary radiation noise is increased depending on the deviation width between the power supply coil and the power reception coil.

An object of the invention is to provide a power feed device, a power reception device, and a power feed method, which are capable of reducing unnecessary radiation noise, by supplying power in a state where the power supply coil and the power reception coil are opposed to each other.

A power feed device according to the invention is a power feed device that supplies power to an external power reception coil, by using electromagnetic action, and includes a power supply coil that supplies power by using the electromagnetic action; a frequency characteristic acquisition unit that acquires frequency characteristics associated with the power supply coil; a resonance frequency specifying unit that specifies a plurality of resonance frequencies, based on the frequency characteristics; and a power supply controller that determines whether or not to supply power to the power reception coil, based on a frequency difference between the plurality of resonance frequencies.

A power reception device according to the invention is a power reception device to which power is supplied from an external power supply coil, by using electromagnetic action, and the power reception device includes a power reception coil to which power is supplied from the power supply coil by using the electromagnetic action; a frequency characteristic acquisition unit that acquires frequency characteristics of power supply efficiency between the power supply coil and the power reception coil; a resonance frequency specifying unit that specifies a resonance frequency based on the frequency characteristics; and a power supply permission determination unit that determines whether or not to permit power supply from the power supply coil to the power reception coil, based on a frequency difference between the resonance frequencies.

A power feed method according to the invention is a power feed method of supplying power to an external power reception coil, by using electromagnetic action, and the power feed method includes a power supplying step of supplying power to a power supply coil by using the electromagnetic action; a frequency characteristic acquisition step of acquiring frequency characteristics associated with the power supply coil to which power is supplied; a resonance frequency specifying step of specifying a resonance frequency, based on the acquired frequency characteristics; and a determination step of determining whether or not to supply power to the power reception coil, based on a frequency difference between the resonance frequencies.

According to the invention, it is possible to reduce unnecessary radiation noise by supplying power in a state where the power supply coil and the power reception coil are opposed to each other.

BRIEF DESCRIPTION OF DRAWINGS

FIG. 6A is a diagram illustrating frequency characteristics in the first exemplary embodiment of the invention.

FIG. 6B is a diagram illustrating frequency characteristics in the first exemplary embodiment of the invention.

FIG. 8 is a diagram illustrating a correction table in the first exemplary embodiment of the invention.

FIG. 11 is a diagram illustrating an example of a configuration of a vehicle-side controller in a second exemplary embodiment of the invention

DETAILED DESCRIPTION OF THE PREFERRED EMBODIMENTS

Hereinafter, embodiments of the invention will be described in detail with reference to the drawings.

First Exemplary Embodiment

<Configuration of Charging System>

Figure 1:
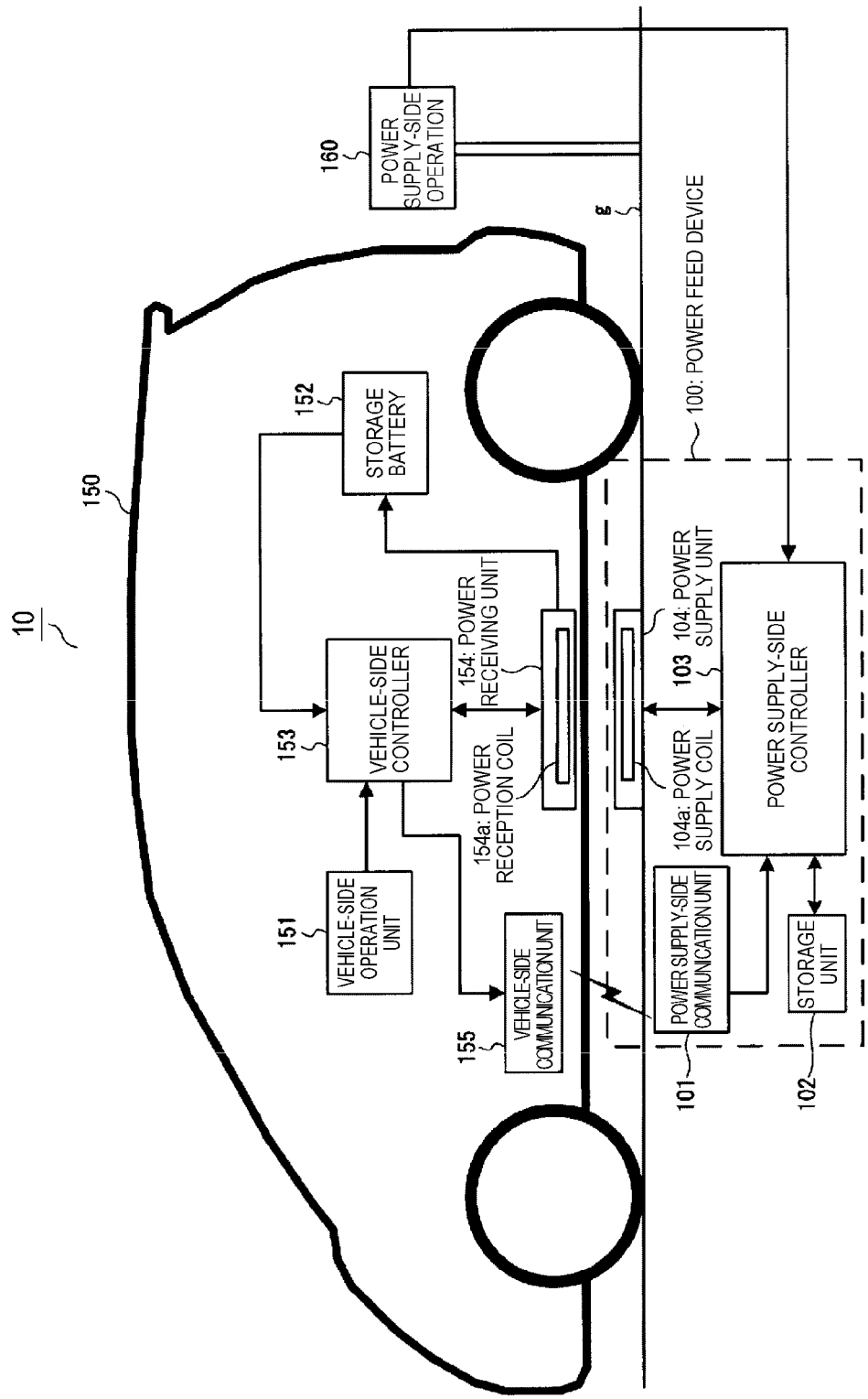
FIG. 1 is a block diagram illustrating a configuration of a charging system in a first exemplary embodiment of the invention.

The configuration of charging system 10 according to a first exemplary embodiment of the invention will be described with reference to FIG. 1. FIG. 1 is a block diagram illustrating the configuration of the charging system in the first exemplary embodiment of the invention.

Charging system 10 includes power feed device 100, vehicle 150, and power supply-side operation unit 160.

In addition, FIG. 1 illustrates a supply-possible state in which power supply coil 104a and power reception coil 154a are opposed to each other.

Power feed device 100 is installed on or embedded in the ground such that power supply unit 104 is exposed from ground surface g. Power feed device 100, for example, is provided in a parking space, and opposes power receiving unit 154 so as to supply power to power receiving unit 154, during parking of vehicle 150. Here, supplying power means supplying power from power supply coil 104a to power reception coil 154a. Examples of supplying power include preliminary supply that supplies a small amount of power to power receiving unit 154 before supplying power to storage battery 152, and main supply that supplies a large amount of power in order to supply power to storage battery 152. In addition, in the following description, those that are simply described as "supply" are intended to include both the preliminary supply and the main supply.

Vehicle 150 is, for example, a vehicle traveling by the power of storage battery 152, such as a hybrid electric vehicle (HEV), a plug-in electric vehicle (PEV), or an electric vehicle (EV). Further, the configuration of vehicle 150 will be described later in detail.

Power supply-side operation unit 160 outputs a supply start signal indicating the start of supply or a supply stop signal indicating the stop of supply to the power feed device 100, in response to an operation from the outside.

<Configuration of Vehicle>

The configuration of vehicle 150 according to the exemplary embodiment of the invention will be described with reference to FIG. 1.

Vehicle 150 is mainly configured with vehicle-side operation unit 151, storage battery 152, vehicle-side controller 153, power receiving unit 154, and vehicle-side communication unit 155.

Vehicle-side operation unit 151 receives various operations by the driver, and outputs a signal corresponding to the received operation to vehicle-side controller 153.

Storage battery 152 stores the power supplied from power feed device 100 through power receiving unit 154.

Vehicle-side controller 153 controls power receiving unit 154 and vehicle-side communication unit 155 so as to perform various processes associated with supply or various processes associated with supply stop, based on various signals that are input from vehicle-side operation unit 151. Vehicle-side controller 153 detects reception power received by power reception coil 154a, and outputs the detection result of the reception power to vehicle-side communication unit 155, as reception power information. In addition, the reception power information may be a value obtained by calculating power supplied to storage battery 152. Vehicle-side controller 153 calculates the ratio of the accumulated power relative to the fully charged power of storage battery 152, and outputs the calculated ratio of the accumulation power as accumulation power information, to vehicle-side communication unit 155. The ratio of the accumulation power, for example, is calculated by the ECU.

Power receiving unit 154 includes power reception coil 154a. Power reception coil 154a receives power supplied from power supply coil 104a of power supply unit 104. Power receiving unit 154 supplies power, that is received by power reception coil 154a, to storage battery 152, in response to the control of vehicle-side controller 153. Power receiving unit 154 is provided in a state of being exposed to the outside, or covered by a resin casing, at the bottom, the side surface, or the top of vehicle 150.

Vehicle-side communication unit 155 transmits the reception power information that is input from vehicle-side controller 153, to power supply-side communication unit 101. Vehicle-side communication unit 155 generates a power reception enable signal indicating a state where receiving power is possible or a power reception disable signal indicating a state where receiving power is not possible, in response to the control of vehicle-side controller 153, and transmits the generated power reception enable signal or the generated power reception disable signal, to power supply-side communication unit 101. Vehicle-side communication unit 155 transmits the accumulation power information that is input from vehicle-side controller 153, to power supply-side communication unit 101. The accumulation power information, for example, is transmitted using controller area network (CAN) communication. Here, the power reception enable signal is transmitted, in the case of a state where storage battery 152 needs to be charged, in the case of a state where electrical leakage is not detected and the vehicle-side is capable of receiving power, or the like. The power reception disable signal is transmitted, in the case of a state where storage battery 152 does not need to receive power at a state of being fully charged, in the case of a state where electrical leakage is detected and the vehicle-side is not capable of receiving power, or the like.

<Configuration of Power Feed Device>

The configuration of power feed device 100 according to the exemplary embodiment of the invention will be described with reference to FIG. 1.

Power feed device 100 is mainly configured with power supply-side communication unit 101, storage unit 102, power supply-side controller 103, and power supply unit 104.

Power supply-side communication unit 101 receives reception power information from vehicle-side communication unit 155, and outputs the received reception power information to power supply-side controller 103. Power supply-side communication unit 101 receives accumulation power information from vehicle-side communication unit 155, and outputs the received accumulation power information to power supply-side controller 103. Power supply-side communication unit 101 receives a power reception enable signal or a power reception disable signal from vehicle-side communication unit 155. Power supply-side communication unit 101 outputs the received power reception enable signal or the received power reception disable signal, to power supply-side controller 103.

Storage unit 102 stores in advance a correction table in which the ratio of accumulation power relative to full charging of storage battery 152 is associated with a correction factor. Storage unit 102 stores a power supply efficiency for each frequency input from power supply-side controller 103. In addition, a calculation method of power supply efficiency will be described later. Storage unit 102 stores in advance, drive frequency information on the start value, the end value, and the step value of the drive frequency. In addition, the correction table will be described later.

When the supply start signal is input from power supply-side operation unit 160, and the power reception enable signal is input from power supply-side communication unit 101, power supply-side controller 103 controls power supply unit 104 so as to perform the preliminary supply on power reception coil 154a while sequentially changing the frequency of power supply coil 104a.

Power supply-side controller 103 reads the correction factor associated with the ratio of the accumulation power indicated by the accumulation power information that is input from power supply-side communication unit 101, with reference to the correction table stored in the storage unit 102.

Power supply-side controller 103 calculates a frequency difference between two peaks of the power supply efficiency in the frequency characteristic of the obtained power supply efficiency, and corrects the calculated frequency difference using the correction factor. When the corrected frequency difference is a threshold or more, power supply-side controller 103 determines to start the main supply. Meanwhile, when the corrected frequency difference is less than the threshold, power supply-side controller 103 determines not to start the main supply. In other words, power supply-side controller 103 determines whether or not to perform the main supply, based on the fact that the smaller the positional deviation between power supply coil 104a and power reception coil 154a, the larger the frequency difference between peaks of the power supply efficiency. In addition, the relationship between the extent of the positional deviation between power supply coil 104a and power reception coil 154a, and the frequency difference between peaks of the power supply efficiency will be described later.

When it is determined to start the main supply (for example, in the case of the state of FIG. 1), power supply-side controller 103 controls power supply unit 104 to start the main supply. Further, when it is determined not to start the main supply, power supply-side controller 103 controls power supply unit 104 not to start the main supply.

When the supply stop signal is input from power supply-side operation unit 160, or when the power reception disable signal is input from power supply-side communication unit 101, during supply, power supply-side controller 103 controls power supply unit 104 so as not to start supply or so as to stop supply. Further, the configuration of power supply-side controller 103 will be described in detail later.

Power supply unit 104 includes power supply coil 104a. Power supply unit 104 performs the preliminary supply from power supply coil 104a while sequentially changing the frequency, and performs the main supply, in response to the control of power supply-side controller 103. Power supply unit 104 supplies power from power supply coil 104a to power reception coil 154a, by an electromagnetic induction method or a magnetic resonance method, for example.

<Configuration of Power Supply Unit>

Figure 2:
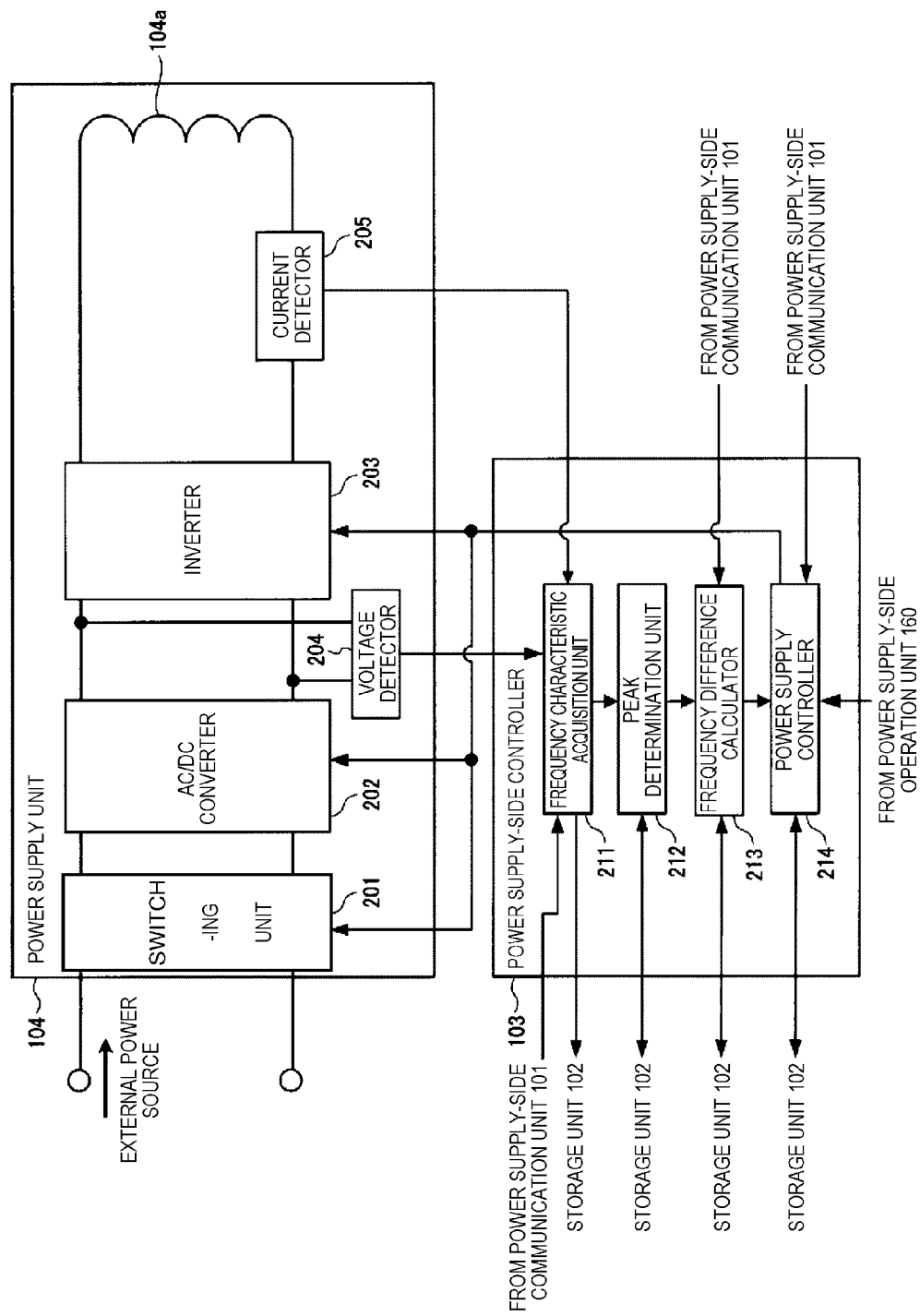
FIG. 2 is a block diagram illustrating configurations of a power supply unit and a power supply-side controller in the first exemplary embodiment of the invention.

The configuration of power supply unit 104 according to the exemplary embodiment of the invention will be described with reference to FIG. 2. FIG. 2 is a block diagram illustrating configurations of the power supply unit and the power supply-side controller in the first exemplary embodiment of the invention.

Power supply unit 104 is mainly configured with switching unit 201, AC/DC converter 202, inverter 203, voltage detector 204, current detector 205, and power supply coil 104a.

Switching unit 201 opens or closes the connection between the external power source (external AC power source) and AC/DC converter 202, in response to the control of power supply controller 214.

AC/DC converter 202 converts AC electrical energy supplied from the external power source into DC electrical energy, and supplies the DC electrical energy to inverter 203. The output voltage of AC/DC converter 202 may be fixed to a predetermined specific voltage, or may be varied by the control of power supply controller 214.

The inverter 203 converts the DC power supplied from AC/DC converter 202 to the AC power, and supplies the AC power to power supply coil 104a. The inverter 203 can change the frequency of the output power, and the magnitude of the output power, in response to the control of power supply controller 214. For example, inverter 203 is controlled to output a low level of power output during the preliminary supply, and is controlled to output a large level of power output during the main supply.

The voltage detector 204 measures the voltage value of the DC power supplied from AC/DC converter 202 to inverter 203, and outputs the measurement result of the voltage value to the frequency characteristic acquisition unit 211 of power supply-side controller 103.

The current detector 205 measures the current value of the AC power supplied from inverter 203 to power supply coil 104a, and outputs the measurement result of the current value to power supply-side controller 103 (specifically, the frequency characteristic acquisition unit 211 illustrated in FIG. 2).

Power supply coil 104a performs the preliminary supply to power reception coil 154a while sequentially changing a frequency, by receiving the AC power supplied from inverter 203, and performs the main supply to power reception coil 154a with power larger than in preliminary supply.

Further, voltage detector 204 is provided between AC/DC converter 202 and inverter 203, but voltage detector 204 may be provided between inverter 203 and power supply coil 104a. Current detector 205 is provided between inverter 203 and power supply coil 104a, but current detector 205 may be provided between AC/DC converter 202 and inverter 203, or on an input path to AC/DC converter 202.

<Configuration of Power Supply-Side Controller>

The configuration of power supply-side controller 103 according to the exemplary embodiment of the invention will be described with reference to FIG. 2.

Power supply-side controller 103 is mainly configured with frequency characteristic acquisition unit 211, peak determination unit (corresponding to a resonance frequency specifying unit) 212, frequency difference calculator 213, and power supply controller 214.

Frequency characteristic acquisition unit 211 sequentially calculates the power supplied from power supply coil 104a at the time of preliminary supply, based on the measurement result of the voltage value input from voltage detector 204 and the measurement result of the current value input from current detector 205. Frequency characteristic acquisition unit 211 sequentially calculates the power supply efficiency, based on the calculated supply power and the reception power information input from power supply-side communication unit 101. Frequency characteristic acquisition unit 211 sequentially stores the calculated power supply efficiency in storage unit 102, and sequentially outputs the calculated power supply efficiency to peak determination unit 212. Further, the frequency characteristic acquisition method will be described later.

Peak determination unit 212 searches for a portion at which the frequency characteristics are the maximum, based on the frequency characteristics acquired by frequency characteristic acquisition unit 211, and specifies the maximum frequency as a resonance frequency. When power reception coil 154a exists opposing power supply coil 104a such that at least parts thereof are overlapped, the number of peaks (maximum value) is plural; and when there is no power reception coil 154a, the number of peaks is 1.

When the frequency characteristics of power supply coil 104a are a unimodal type with one resonance frequency, the peak (a maximum value) coincides with the minimum part in the frequency characteristics of a bimodal type with two resonance frequencies. The frequency of the peak in a unimodal type is referred to as "a specific resonance frequency of power supply coil 104a", and is the frequency of the valley (minimum value) between the resonance frequencies to be bimodal. Peak determination unit 212 outputs a determination result of the peak determination process to frequency difference calculator 213. In addition, a peak determination method will be described later.

Frequency difference calculator 213 calculates a frequency difference between peaks from the determination result of the peak determination process that is input from peak determination unit 212. Frequency difference calculator 213 reads a correction factor that is associated with the rate of the accumulation power indicated by accumulation power information that is input from power supply-side communication unit 101, by referring to the correction table stored in storage unit 102. Frequency difference calculator 213 corrects the calculated frequency difference by using the read correction factor, and outputs the corrected frequency difference to power supply controller 214.

When the supply start signal is input from power supply-side operation unit 160, and the power reception enable signal is input from power supply-side communication unit 101, power supply controller 214 reads the drive frequency information stored in storage unit 102, in order to start the preliminary supply. Power supply controller 214 makes the external power source and AC/DC converter 202 be in a connected state by closing switching unit 201, and controls inverter 203 so as to change the frequency of the AC power supplied to power supply coil 104a based on the drive frequency information. Thus, power supply unit 104 starts the preliminary supply.

Power supply controller 214 determines whether or not to perform the main supply, based on the calculation result of the corrected frequency difference that is input from frequency difference calculator 213.

When it is determined to perform the main supply, power supply controller 214 maintains the connection state between the external power source and AC/DC converter 202 by closing switching unit 201. Power supply controller 214 controls AC/DC converter 202 and inverter 203 so as to output power higher than during the preliminary supply. Thus, power supply unit 104 performs the main supply at a larger power than in the preliminary supply.

When it is determined not to perform the main supply, power supply controller 214 controls AC/DC converter 202 such that the external power source and AC/DC converter 202 is in a non-connection state. Thus, the supply of power from the external power source to power supply coil 104a through AC/DC converter 202 and inverter 203 is stopped. In this case, power feed device 100 does not perform the main supply.

After starting supplying power, when the supply stop signal is input from power supply-side operation unit 160, or when the power reception disable signal is input from the power supply-side communication unit, power supply controller 214 controls AC/DC converter 202 and inverter 203 so as to stop supplying power.

<Operation of Power Feed Device>

Figure 3:
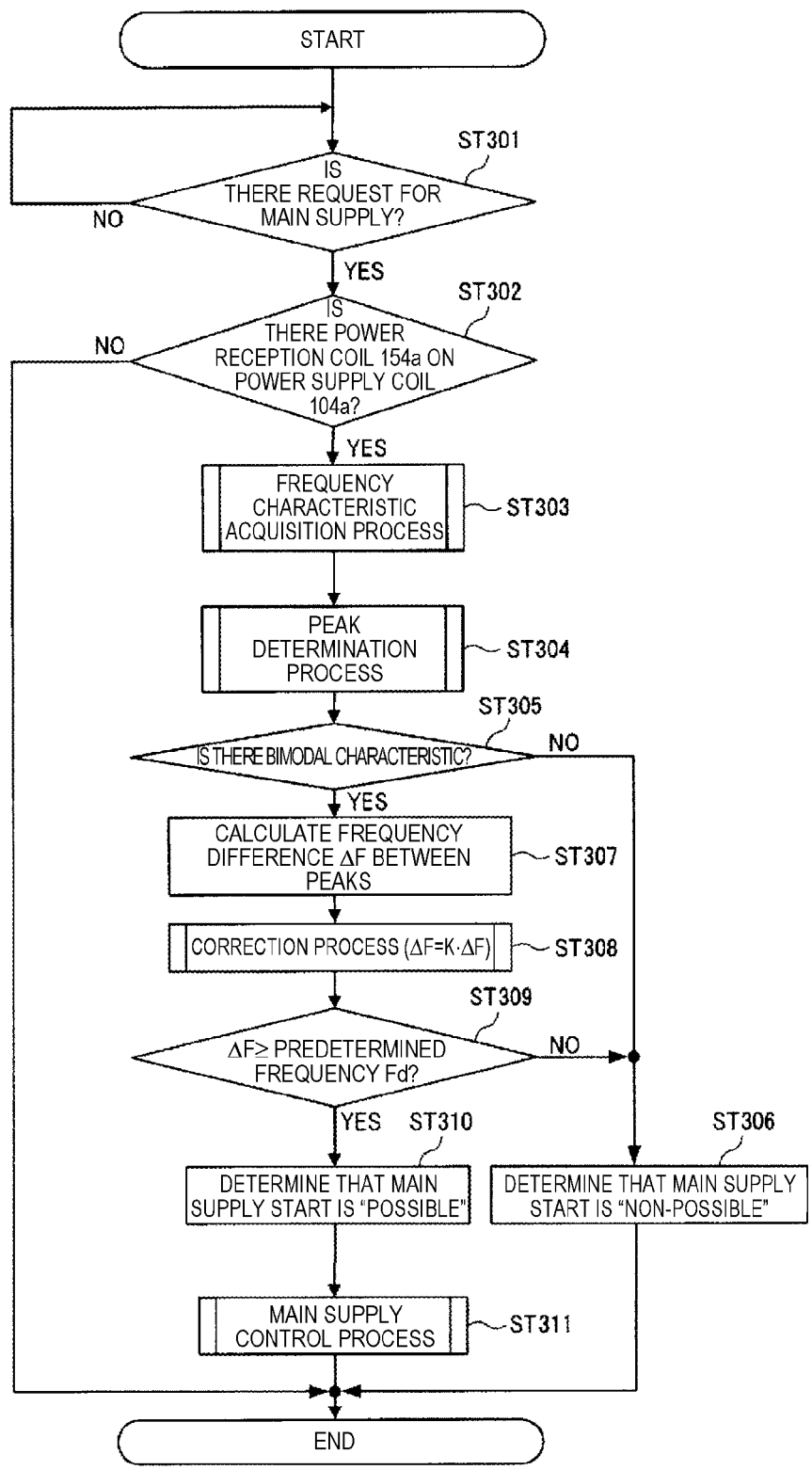
FIG. 3 is a flowchart illustrating an operation of a power feed device in the first exemplary embodiment of the invention.

The operation of power feed device 100 according to the exemplary embodiment of the invention will be described with reference to FIG. 3. FIG. 3 is a flowchart illustrating an operation of a power feed device in the first exemplary embodiment of the invention.

First, power supply controller 214 of power supply-side controller 103 determines whether or not there is a request for the main supply by receiving the supply start signal and the power reception enable signal (step ST301).

When there is no request for the main supply (step ST301: NO), power supply controller 214 repeats the process of step ST301.

Meanwhile, when there is the request for the main supply (step ST301: YES), power supply controller 214 starts AC/DC converter 202 and inverter 203, and determines whether or not there is power reception coil 154a on power supply coil 104a (step ST302). For example, power supply controller 214 acquires an image captured by a camera (not shown) mounted on vehicle 150, from power supply-side communication unit 101, through vehicle-side communication unit 155, and analyzes the captured image so as to determine whether or not there is power reception coil 154a on power supply coil 104a.

When it is determined that there is no power reception coil 154a on power supply coil 104a (step ST302: NO), power supply controller 214 controls AC/DC converter 202 and inverter 203 so as not to start the main supply.

Meanwhile, when it is determined that there is power reception coil 154a on power supply coil 104a (step ST302: YES), power supply controller 214 starts AC/DC converter 202 and inverter 203.

Then, the frequency characteristic acquisition unit 211 performs a frequency characteristic acquisition process of power supply efficiency (step ST303). In addition, a frequency characteristic acquisition method will be described later.

Next, peak determination unit 212 performs the peak determination process, based on the power supply efficiency that was calculated before the previous time and stored in the storage unit 102 and the current power supply efficiency that is acquired from the frequency characteristic acquisition unit 211 (step ST304). In addition, the peak determination method will be described later.

Further, peak determination unit 212 determines whether there is a bimodal characteristic in which two peaks appear in the supply efficiency in the frequency characteristic of the power supply efficiency (step ST305).

When peak determination unit 212 determines that there is no bimodal characteristic (step ST305: NO), power supply controller 214 determines that the main supply start is "non-possible" (step ST306), and ends the process. This case is a state where power reception coil 154a does not exist in the position opposite to power supply coil 104a. Thus, power feed device 100 does not start the main supply.

Meanwhile, when peak determination unit 212 determines that there is the bimodal characteristic (step ST305: YES), the frequency difference calculator 213 calculates a frequency difference ΔF between peaks of the frequency characteristic of the power supply efficiency (step ST307).

Next, the frequency difference calculator 213 multiplies the frequency difference ΔF between peaks by the correction factor k read from the correction table and corrects the frequency difference ΔF between peaks (step ST308).

Next, power supply controller 214 determines whether or not the corrected frequency difference (k*ΔF) between peaks is a threshold (predetermined frequency Fd) or more (step ST309).

When it is determined that the corrected frequency difference (k*ΔF) between peaks is less than the threshold (step ST309: NO), power supply controller 214 determines that the main supply start is "non-possible" (step ST306), and ends the process. This case is a state where the positional deviation occurs in power supply coil 104a and power reception coil 154a and the power supply efficiency is a tolerance or less, or the unnecessary radiation noise is a tolerance or more. Thus, power feed device 100 does not start the main supply.

Meanwhile, when it is determined that the corrected frequency difference (k*ΔF) between peaks is the threshold or more (step ST309: YES), power supply controller 214 determines that the main supply start is "possible" (step ST310), and starts a main supply control process (step ST311).

Thereafter, when storage battery 152 has been fully charged, power feed device 100 ends the main supply control process.

In addition, in FIG. 3, after the completion of the frequency characteristic acquisition process of step ST303, the peak determination process of step ST304 is performed, but the frequency characteristic acquisition process of step ST303 and the peak determination process of step ST304 may be performed in parallel with each other.

<Frequency Characteristic Acquisition Method>

Figure 4:
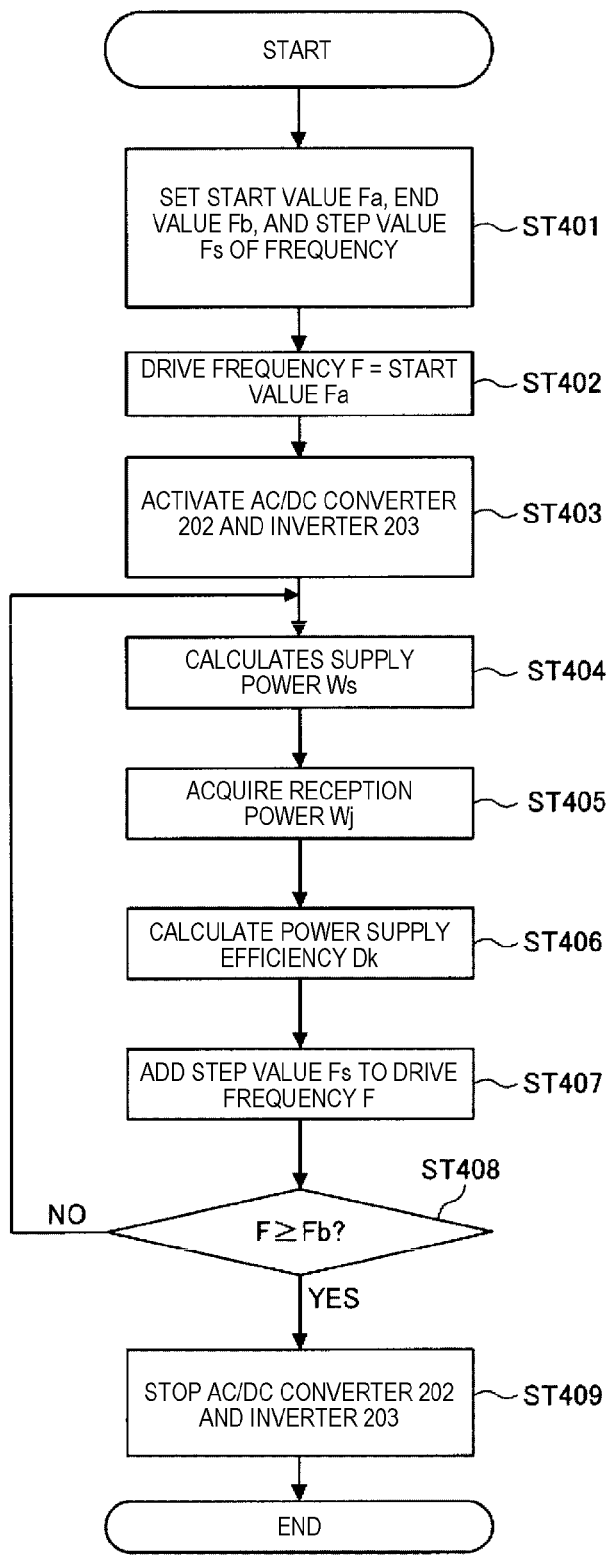
FIG. 4 is a flowchart illustrating a frequency characteristic acquisition method in the first exemplary embodiment of the invention.

The frequency characteristic acquisition method according to the exemplary embodiment of the invention will be described with reference to FIG. 4. FIG. 4 is a flowchart illustrating a frequency characteristic acquisition method in the first exemplary embodiment of the invention.

First, power supply controller 214 acquires and sets start value Fa, end value Fb, and step value Fs of drive frequency F, that is the drive frequency information stored in the storage unit 102 (step ST401).

Next, power supply controller 214 sets start value Fa as drive frequency F (step ST402).

Next, power supply controller 214 starts AC/DC converter 202 and inverter 203 (step ST403).

Next, the frequency characteristic acquisition unit 211 calculates the supply power Ws of the preliminary supply, based on the measurement result of the voltage value input from the voltage detector 204 and the measurement result of the current value input from the current detector 205 (step ST404). Here, since the supply power Ws is the power in the preliminary supply, the supply power Ws is less than the supply power in the main supply.

Next, the frequency characteristic acquisition unit 211 acquires the reception power information on the reception power Wj from power supply-side communication unit 101 (step ST405).

Next, the frequency characteristic acquisition unit 211 calculates the power supply efficiency Dk, based on the calculated supply power Ws and the reception power Wj acquired in step ST405 (step ST406). For example, the frequency characteristic acquisition unit 211 calculates the power supply efficiency Dk by dividing the reception power Wj by the supply power Ws (Wj/Ws).

The frequency characteristic acquisition unit 211 stores the calculated power supply efficiency Dk in the storage unit 102.

Next, power supply controller 214 adds step value Fs to drive frequency F (step ST407).

Next, power supply controller 214 determines whether or not drive frequency F is end value Fb or more (step ST408).

When drive frequency F is less than end value Fb (step ST408: NO), power supply controller 214 returns to the process of step ST404.

Meanwhile, when drive frequency F is end value Fb or more (step ST408: Yes), power supply controller 214 stops AC/DC converter 202 and inverter 203 (step ST409).

In addition, in FIG. 4, step value Fs is added to drive frequency F in step ST407 by setting end value Fb to a higher frequency side than start value Fa, but step value Fs may be subtracted from drive frequency F in step ST407 by setting end value Fb to a lower frequency side than start value Fa. Further, drive frequency F may be raised or lowered.

<Peak Determination Method>

Figure 5:
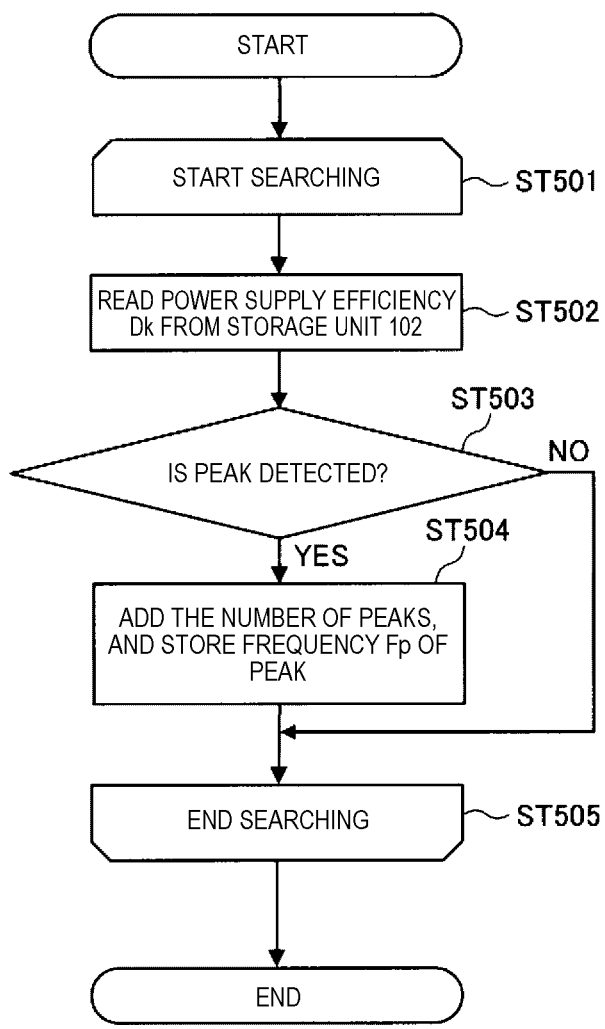
FIG. 5 is a flowchart illustrating a peak determination method in the first exemplary embodiment of the invention.

The peak determination method according to the exemplary embodiment of the invention will be described with reference to FIG. 5. FIG. 5 is a flowchart illustrating a peak determination method in the first exemplary embodiment of the invention.

The peak determination process is performed by using the frequency characteristic of the power supply efficiency acquired by the frequency characteristic acquisition method described above.

The peak determination unit 212 starts searching (step ST501), and reads the power supply efficiency Dk that was calculated before the previous time and stored in the storage unit 102 (step ST502).

Next, peak determination unit 212 determines whether or not to detect the peak (step ST503). For example, when the power supply efficiency calculated before the previous time is higher than the power supply efficiency calculated before the previous time, and the power supply efficiency calculated at this time is lower than the power supply efficiency calculated last time, peak determination unit 212 determines that the power supply efficiency calculated last time is a peak.

When it is determined that a peak is detected (step ST503: YES), peak determination unit 212 adds "1" as the number of peaks, and stores a frequency Fp at which the power supply efficiency reaches a peak in the storage unit 102 (step ST504).

Meanwhile, when it is determined that a peak is not detected (step ST503: NO), peak determination unit 212 skips the process of step ST504, and ends the searching (step ST505).

In addition, in the peak determination process, the searching of step ST501 to step ST505 is performed in the same range or a narrower range than the range of a frequency when obtaining the frequency characteristics.

<Frequency Characteristic of Power Supply Efficiency>

The frequency characteristic of power supply efficiency according to the exemplary embodiment of the invention will be described with reference to FIG. 6A and FIG. 6B. Each of FIG. 6A and FIG. 6B is a diagram illustrating frequency characteristics in the first exemplary embodiment of the invention.

FIG. 6A illustrates the frequency characteristic of the power supply efficiency in case of a state where power reception coil 154a exists in a position opposed to power supply coil 104a. FIG. 6B illustrates the frequency characteristic of the power supply efficiency in case of a state where power supply coil 104a and power reception coil 154a are shifted in a transverse direction.

As illustrated in FIG. 6, the smaller the positional deviation between power supply coil 104a and power reception coil 154a is, the larger the frequency difference between peaks is.

Thus, power feed device 100 can estimate that power reception coil 154a exists in a position opposed to power supply coil 104a, based on the frequency differences N1 and N2 (N1>N2) between peaks of the power supply efficiency in the frequency characteristic of the power supply efficiency. Specifically, when the frequency difference N1 between peaks is the threshold T or more (in the case where N1≥T), power supply controller 214 determines to perform the main supply; and when the frequency difference N2 between peaks is less than the threshold T (in the case where N2<threshold T), power supply controller 214 determines not to perform the main supply.

Here, in the case of a state where power reception coil 154a does not exist on power supply coil 104a, the frequency characteristic of the power supply efficiency has one peak. In contrast, the frequency characteristic of the power supply efficiency necessarily has two or more peaks, in the case of a state where power supply coil 104a and power reception coil 154a are opposed even slightly.

<Description of Configuration in which the Peak Determination Number is Three or More>

Figure 7A:
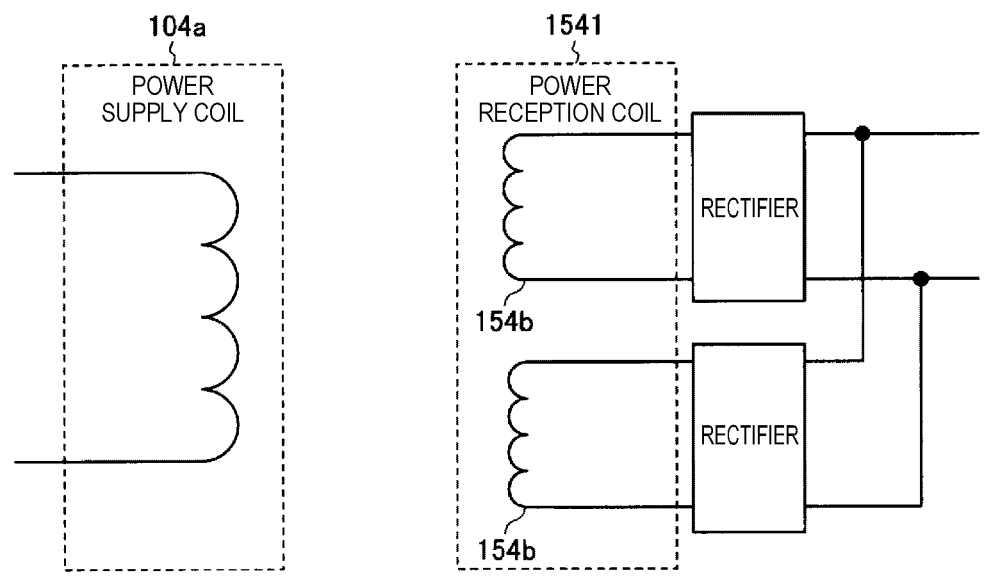
FIG. 7A is a diagram illustrating a configuration of a power reception coil having three peaks.

Next, the case will be described in which three or more peaks exist in the frequency of the power supply efficiency. FIG. 7A illustrates a modification example of the power reception coil.

Power reception coil 1541 on the reception side illustrated in FIG. 7A is configured by connecting plural power reception coils 154b and rectifies in an array shape. When the resonance frequencies between power supply coil 104a and the respective power reception coils 154b are different, the frequency characteristic line of the value of the current flowing through power supply coil 104a has two peaks (bimodal) illustrated in FIG. 6A, but may have three or more peaks as illustrated in FIG. 7B.

Figure 7B:
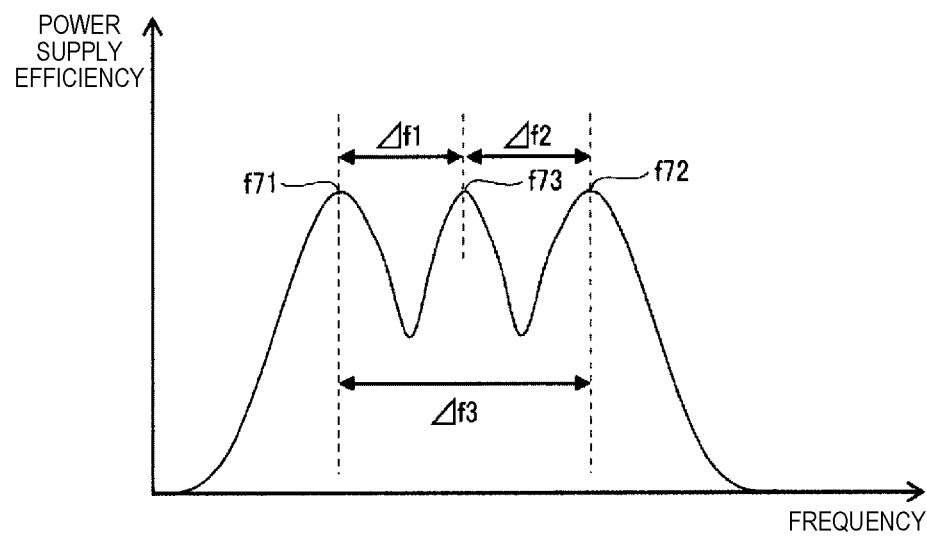
FIG. 7B is a diagram illustrating frequency characteristics thereof.

When three or more peaks (here, three peaks) as illustrated in FIG. 7(b) are detected, the frequency difference calculator 213 calculates a frequency difference between any two points among Δf1, Δf2, and Δf3.

Specifically, one of the frequency difference Δf1 between the resonance frequencies f71 and f73, the frequency difference Δf2 between the resonance frequencies f73 and f72, and the frequency difference Δf3 between the resonance frequencies f71 and f72 is calculated.

Then, thereafter, the frequency difference calculator 213 corrects the frequency difference between peaks, by multiplying the correction factor k that is read from the correction table by the frequency difference between peaks. Next, power supply controller 214 reads thresholds of respective frequency differences when power supply coil 104a and reception coil 154a are deviated, the thresholds being stored in storage unit 102 in association with the respective frequency differences Δf1, Δf2, and Δf3. Power supply controller 214 compares these thresholds with the respective frequency differences Δf1, Δf2, and Δf3, and determines whether or not to start the main supply.

<Correction Table>

An example of a correction table according to the exemplary embodiment of the invention will be described with reference to FIG. 8. FIG. 8 is a diagram illustrating a correction table in the first exemplary embodiment of the invention.

In the correction table stored in storage unit 102, a correction factor corresponding to the state of charge (SOC) of storage battery 152 is set. For example, as illustrated in FIG. 8, the correction table sets a correction factor for reducing the frequency difference between peaks as the ratio of the accumulated power relative to the full charge of storage battery 152 increases.

Modification Example of Using Frequency Characteristics of Current Value or Voltage Value, Instead of Frequency Characteristics of Power Supply Efficiency Although whether or not to perform the main supply is determined based on the frequency characteristics of the power supply efficiency at the time of preliminary supply in the present embodiment, whether or not to perform the main supply may be determined based on the frequency characteristics of the current value or the voltage value of power supply coil 104a at the time of preliminary supply.

In this case, the frequency characteristics of the power supply efficiency and the frequency characteristics of the current value or the voltage value show the same characteristics. The reason will be described later.

In charging system 10, a coupling coefficient varies under the influence of a distance and an axis deviation between power supply coil 104a and power reception coil 154a. If the power supply efficiency is assumed as η and the current value of power supply coil 104a is assumed as $I_1$, η and $I_1$ can be expressed as Equation (1) as a function including drive frequency f and the coupling coefficient k.

$$\begin{cases} \eta = X(k, \alpha f) \\ I_1 = V x Y(k, f) \end{cases} \quad (1)$$

Here, V: power source voltage
α: constant

When power source voltage V is constant, and the distance and the axis deviation between power supply coil 104a and power reception coil 154a do not vary, the coupling coefficient k becomes constant (k=constant), and the power supply efficiency η and the current value $I_1$ of power supply coil 104a are respectively uniquely determined for drive frequency f. It has been seen that there are two resonance frequencies $f_1$ and $f_2$ (maximum point) in the characteristics of the power supply efficiency η in a state where the coupling coefficient is high (see Equation (2) below). Similarly, it has been seen that there are two resonance frequencies $f_3$ and $f_4$ (maximum point) in the characteristics of the current value $I_1$ of power supply coil 104a (see Equation (2) below). In other words, there is a correlation between the current value $I_1$ and the power supply efficiency η.

$$\begin{cases} \left.\dfrac{\partial \eta}{\partial f}\right|_{f=f1,f2} = 0 \\ \left.\dfrac{\partial I_1}{\partial f}\right|_{f=f3,f4} = 0 \end{cases} \qquad (2)$$

Figure 9:
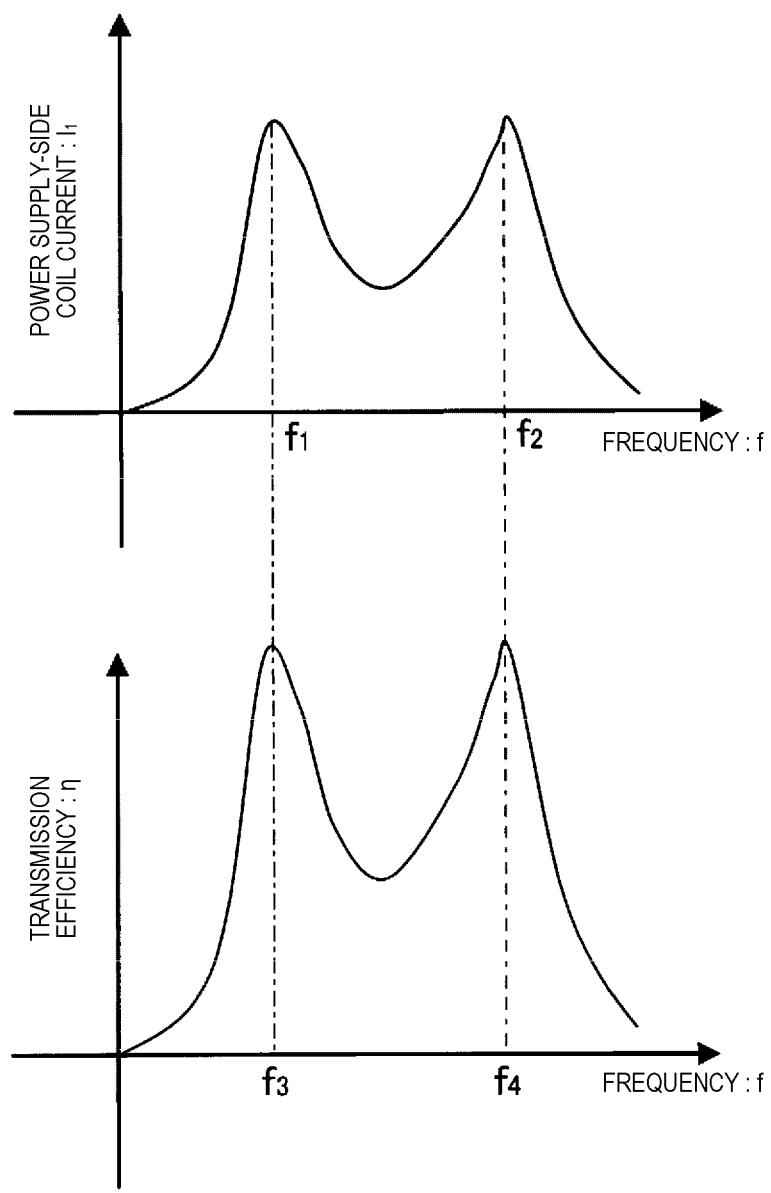
FIG. 9 is diagrams illustrating a relationship between power supply efficiency and frequency, and a relationship between power supply-side coil current and frequency.

FIG. 9 illustrates a relationship between power supply efficiency and frequency, and a relationship between power supply-side coil current (a current flowing through power supply coil 104a) and frequency.

As illustrated in FIG. 9, it can be confirmed that $f_1=f_3$ and $f_2=f_4$, by performing circuit simulation using an equivalent circuit model, and it can be understood that the detection of two resonance frequencies can be performed by using either the power supply efficiency η or the value $I_1$ of the current flowing through power supply coil 104a.

Further, the value $I_1$ of the current flowing through power supply coil 104a has a correlation with the input current value of AC/DC converter 202, or the output current value of AC/DC converter 202. In other words, the value $I_1$ of the current flowing through power supply coil 104a can be estimated from the input current value of AC/DC converter 202 and the output current value of AC/DC converter 202.

Thus, the frequency characteristics of the power supply efficiency can be obtained using a current value that is measured between switching unit 201 and AC/DC converter 202, or between AC/DC converter 202 and inverter 203, without directly detecting the current of power supply coil 104a.

With respect to the characteristics illustrated in Equation (1), Equation (2), and FIG. 7, similar correlation is also established between the power supply efficiency η and the voltage value applied to power supply coil 104a. Further, the characteristics are also established in the voltage value applied to power supply coil 104a, or the output voltage value of AC/DC converter 202.

In this manner, since the frequency characteristics of the power supply efficiency are calculated by obtaining the frequency characteristics of the current value of power supply coil 104a, it is not necessary to perform wireless communication with vehicle 150, and the frequency characteristics of the power supply efficiency can be obtained by only a process in power feed device 100.

Effect of First Exemplary Embodiment

According to the present embodiment, it is possible to reduce unnecessary radiation noise, by performing the main supply in a state where the power supply coil and the power reception coil are opposed to each other. In addition, it is possible to obtain an effect that prevents adverse effects on human bodies and prevents interference with peripheral equipment, due to the reduction of unnecessary radiation noise.

In addition, according to the exemplary embodiment, to correct the frequency difference between peaks, depending on the ratio of accumulated power relative to the fully charged power of storage battery 152, it is possible to properly perform power supply determination according to the ratio of the accumulated power.

Further, according to the exemplary embodiment, since the main supply is not performed when there is no power reception coil 154a on power supply coil 104a, it is possible to prevent power feed device 100 from performing the main supply in a state with no load, and to prevent adverse effects on human bodies by electromagnetic fields.

Further, according to the exemplary embodiment, since the preliminary supply is performed with power lower than the supplied power of the main supply, it is possible to suppress the power consumption in power feed device 100.

Modification Example of First Exemplary Embodiment

In the present exemplary embodiment, the frequency difference between peaks is corrected by using the correction factor, but the frequency difference may be compared with the threshold, without correcting the frequency difference between the peaks.

When the number of resonance frequencies is two, when the frequency difference between the specific resonance frequency of power supply coil 104a and one of the resonance frequencies is a threshold or more, power may be supplied to power reception coil 154a. Here, the specific resonance frequency of power supply coil 104a is a resonance frequency of power supply coil 104a in a state where there is no power reception coil 154a. Since the specific resonance frequency of power supply coil 104a is a frequency of a valley (a minimum value) between the resonance frequencies, a difference between this "resonance frequency of power supply coil 104a" and one of the two resonance frequencies may be compared with the threshold. Thus, the determination can be performed faster than the determination performed by comparing differences of both of two resonance frequencies with a threshold.

Although the correction table that associates the accumulation power for the full charge of storage battery 152 with the correction factor is described in the present exemplary embodiment, a correction table that associates a parameter other than the accumulation power for the full charge of storage battery 152 with the correction factor may be used.

Although power supply-side controller 103 determines whether or not to perform the main supply when the supply start signal is input from power supply-side operation unit 160 in the present exemplary embodiment, for example, whether or not to perform the main supply may be performed when the supply start signal is acquired from vehicle-side communication unit 155 through power supply-side communication unit 101. In other words, power supply-side controller 103 may determine whether or not to perform the main supply when the supply start signal is acquired from any means from vehicle 150 side.

Although a peak is determined by using the comparison result of the power supply efficiency in the present exemplary embodiment, peaks may be determined based on a differential value of the frequency characteristics of the power supply efficiency.

Second Exemplary Embodiment

<Configuration of Charging System>

Figure 10:
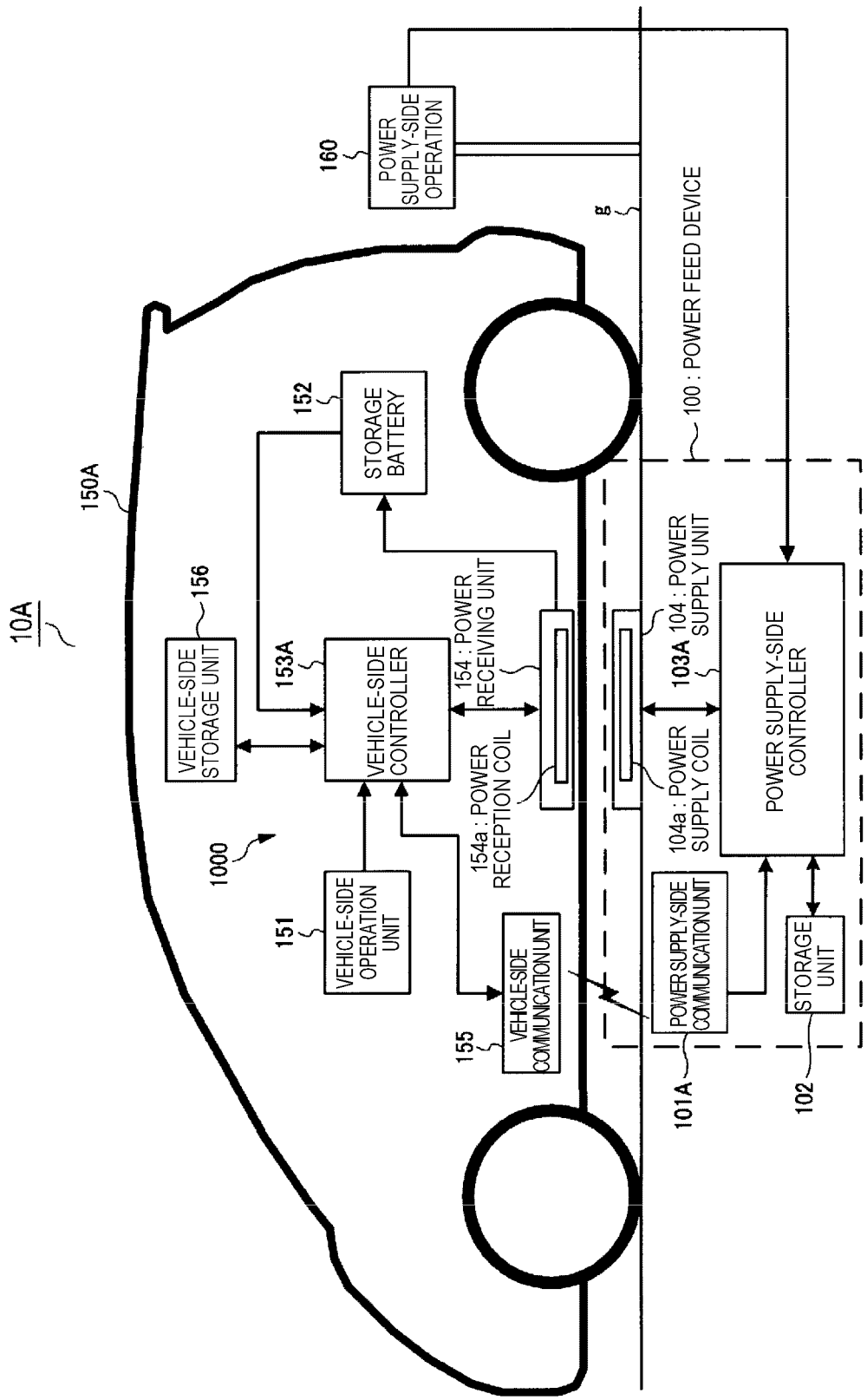
FIG. 10 is a block diagram illustrating a configuration of a charging system in a second exemplary embodiment of the invention.

The configuration of a charging system 10A according to a second exemplary embodiment of the invention will be described with reference to FIG. 10. FIG. 10 is a block diagram illustrating a configuration of a charging system in a second exemplary embodiment of the invention.

Charging system 10A of the second exemplary embodiment is configured in such a manner that a permission determination of the supplying operation is performed on a reception side (vehicle 150 side).

Charging system 10A includes power feed device 100A, vehicle 150A, and power supply-side operation unit 160. The same components as in charging system 10 are denoted by the same symbols and the same names, and thus the description thereof will be omitted.

In addition, FIG. 10 illustrates a supply-possible state in which power supply coil 104a and power reception coil 154a are opposed to each other.

Power feed device 100A has the same basic configuration as power feed device 100. Power feed device 100A is installed on or embedded in the ground such that power supply unit 104 is exposed from ground surface g.

In the present charging system 10A, a resonance frequency is specified based on the frequency characteristic of the power supply efficiency, and permission or non-permission of power supply from power supply coil 104a to power reception coil 154a is determined based on a frequency difference between specified resonance frequencies. In the second exemplary embodiment, the power receiving-side (vehicle 150A side) performs the determination as to the power supply based on the frequency difference between the specified resonance frequencies.

For example, vehicle 150A is a vehicle traveling by the power of storage battery 152, such as a hybrid electric vehicle (HEV), a plug-in electric vehicle (PEV), or an electric vehicle (EV). Further, the configuration of vehicle 150A will be described newly includes a vehicle-side storage unit 156 as compared to the configuration of vehicle 150 illustrated in FIG. 1. The details will be described later.

Power supply-side operation unit 160 outputs a supply start signal indicating the start of supplying or the supply stop signal indicating the stop of supplying to power feed device 100A, in response to an operation from the outside.

<Configuration of Power Feed Device>

The configuration of power feed device 100A according to the exemplary embodiment of the invention will be described with reference to FIG. 10.

The basic configuration of power feed device 100A is the same as power feed device 100. Power feed device 100A is mainly configured with power supply-side communication unit 101A, storage unit 102, power supply-side controller 103A, and power supply unit 104.

Power supply-side communication unit 101A receives reception power information from vehicle-side communication unit 155, and outputs the received reception power information to power supply-side controller 103. Power supply-side communication unit 101A receives the accumulation power information from vehicle-side communication unit 155, and outputs the received accumulation power information to power supply-side controller 103A. Power supply-side communication unit 101A receives a power reception enable signal or a power reception disable signal from vehicle-side communication unit 155. Power supply-side communication unit 101A outputs the power reception enable signal or the power reception disable signal, which is received, to power supply-side controller 103A. Power supply-side communication unit 101A transmits power when supplying power to power supply coil 104a (mainly, the preliminary supply), and the frequency at that time, to vehicle-side communication unit 155.

Storage unit 102 stores in advance a correction table in which the ratio of accumulated power relative to full charged power of storage battery 152 is associated with a correction factor. Storage unit 102 stores a power supply efficiency for each frequency transmitted from vehicle-side communication unit 155.

When the supply start signal is input from power supply-side operation unit 160, and the power reception enable signal is input from power supply-side communication unit 101A, power supply-side controller 103A controls power supply unit 104 so as to perform the preliminary supply on power reception coil 154a while sequentially changing the frequency of power supply coil 104a.

When the power reception enable signal is input from vehicle-side communication unit 155 through power supply-side communication unit 101A, power supply-side controller 103A controls power supply unit 104 so as to start the main supply. Further, when the supply stop signal is input from power supply-side operation unit 160, or when the power reception disable signal is input from power supply-side communication unit 101A, during supplying, power supply-side controller 103A controls power supply unit 104 so as not to start the supplying or so as to stop the supplying.

Power supply unit 104 includes a power supply coil 104a. Power supply unit 104 performs the preliminary supply from power supply coil 104a while sequentially changing the frequency, and performs the main supply, in response to the control of power supply-side controller 103A. Power supply unit 104 supplies power from power supply coil 104a to power reception coil 154a, for example, according to an electromagnetic induction method or a magnetic resonance method.

<Configuration of Vehicle>

The configuration of vehicle 150A according to the second exemplary embodiment of the invention will be described with reference to FIG. 10.

Vehicle 150A includes a power reception device 1000, and the power reception device 1000 is mainly configured with vehicle-side operation unit 151, storage battery 152, vehicle-side controller 153A, power receiving unit 154, vehicle-side communication unit 155, and vehicle-side storage unit 156.

Vehicle-side operation unit 151 receives various operations by the driver, and outputs a signal corresponding to the received operation to vehicle-side controller 153A.

Storage battery 152 stores the power supplied through power receiving unit 154 from power feed device 100A.

Vehicle-side controller 153A controls power receiving unit 154 and vehicle-side communication unit 155 so as to perform various processes associated with supplying or various processes associated with supplying stop, based on various signals that are input from vehicle-side operation unit 151. Vehicle-side controller 153A detects reception power received by power reception coil 154a, and outputs the detection result of the reception power as reception power information, to the vehicle-side storage unit 156 and vehicle-side communication unit 155. Vehicle-side controller 153A calculates the ratio of the accumulated power relative to the full charged power of storage battery 152, and outputs the calculated ratio of the accumulation power as accumulation power information, to vehicle-side communication unit 155. The ratio of the accumulation power, for example, is calculated by the ECU.

Power receiving unit 154 includes a power reception coil 154a. Power reception coil 154a is supplied with power from power supply coil 104a of power supply unit 104. Power receiving unit 154 supplies power that is received by power reception coil 154a to storage battery 152 in respond to the control of vehicle-side controller 153A. Power receiving unit 154 is provided in a state of being exposed to the outside or covered by a resin casing, at the bottom, the side surface, or the top of vehicle 150A.

Vehicle-side communication unit 155 transmits power, that is received from power supply-side communication unit 101A, when supplying power to power supply coil 104a (mainly, the preliminary supply), and the frequency at that time, to vehicle-side controller 153A. Further, vehicle-side communication unit 155 transmits the reception power information that is input from vehicle-side controller 153A, to power supply-side communication unit 101A. Vehicle-side communication unit 155 generates a power reception enable signal indicating a state where receiving power is possible or a power reception disable signal indicating a state where receiving power is non-possible, in response to the control of vehicle-side controller 153A, and transmits the power reception enable signal or the power reception disable signal, which is generated, to power supply-side communication unit 101. Vehicle-side communication unit 155 transmits the accumulation power information that is input from vehicle-side controller 153A, to power supply-side communication unit 101A. The accumulation power information, for example, is transmitted using controller area network (CAN) communication. Here, the power reception enable signal is transmitted in the case of a state where storage battery 152 needs to be charged, in the case of a state where electrical leakage is not detected and the vehicle-side is capable of receiving power, or the like. The power reception disable signal is transmitted, in the case of a state where storage battery 152 does not need to receive power at a state of being fully charged, in the case of a state where electrical leakage is detected and the vehicle-side is not capable of receiving power, or the like.

Vehicle-side storage unit 156 stores the reception power of power receiving unit 154 acquired by vehicle-side controller 153A. In addition, the power supply efficiency for each frequency calculated by the frequency characteristic acquisition unit 1531 (see FIG. 11) and the frequency characteristics based on the power supply efficiency are stored.

Vehicle-side storage unit 156 may store in advance the correction table stored in the storage unit 102 of the first exemplary embodiment. Further, the correction table is configured by associating the ratio of the accumulation power relative to the full charging of storage battery 152 with the correction factor (see FIG. 8). Vehicle-side storage unit 156 stores in advance the drive frequency information on the start value, the end value, and the step value of the drive frequency.

<Configuration of Vehicle-Side Controller 153A>

FIG. 11 is a diagram illustrating an example of a configuration of a power reception device 1000 of a vehicle 150A in a second exemplary embodiment of the invention.

Power reception device 1000 illustrated in FIG. 11 is mainly configured with vehicle-side controller 153A, frequency characteristic acquisition unit 1531, peak determination unit (a resonance frequency specifying unit) 1532, frequency difference calculator 1533, and power supply permission determination unit 1534.

Further, in vehicle controller 153A, the respective functions of a frequency characteristic acquisition unit 1531, peak determination unit (resonance frequency specifying unit) 1532, and frequency difference calculator 1533 are the same as the functions of the components of the same names in power supply-side controller 103 in the first exemplary embodiment.

Frequency characteristic acquisition unit 1531 receives the power supplied from the supplying side, and the frequency at that time, through vehicle-side communication unit 155.

Frequency characteristic acquisition unit 1531 calculates the power supply efficiency, based on the supplying power and the frequency that are received from the supplying side, and the reception power of power receiving unit 154. Frequency characteristic acquisition unit 1531 calculates the frequency characteristic based on the calculated power supply efficiency for each frequency, sequentially stores the frequency characteristics in vehicle-side storage unit 156, and sequentially outputs the frequency characteristic to peak determination unit 1532.

Peak determination unit 1532 searches for a portion in which the frequency characteristic is the maximum, based on the frequency characteristic acquired by frequency characteristic acquisition unit 1531, and specifies the frequency at which the frequency characteristics are the maximum, as the resonance frequency. Specifically, peak determination unit 1532 performs the peak determination process of the power supply efficiency, based on the power supply efficiency that was calculated before the previous time and stored in the vehicle-side storage unit 156 and the current power supply efficiency that is input from the frequency characteristic acquisition unit 1531. In the peak determination process, peak determination unit 1532 searches for a maximum frequency in the frequency characteristics of the power supply efficiency, and specifies the frequency as the resonance frequency. Since the peak determination method is the same as by peak determination unit 212 of the supplying side described above, the description thereof is omitted. Peak determination unit 1532 outputs the determination result of the peak determination process to frequency difference calculator 1533.

Frequency difference calculator 1533 calculates the frequency difference between peaks from the determination result of the peak determination process that is input from peak determination unit 1532. Since the calculation method of the frequency difference is the same as in frequency difference calculator 213 of the supplying side, a description thereof will be omitted. In addition, if the same correction table as the correction table stored in storage unit 102 is stored in vehicle-side storage unit 156, frequency difference calculator 1533 refers to the correction table. In other words, frequency difference calculator 1533 corrects the calculated frequency difference by using the correction factor read from vehicle-side storage unit 156, and outputs the corrected frequency difference to power supply permission determination unit 1534. In this manner, frequency difference calculator 1533 may correct the frequency difference, depending on the residual capacity of the storage battery 152.

Power supply permission determination unit 1534 determines which one of the power reception enable signal (power supply permission signal) and the power reception disable signal (power supply non-permission signal) is to be transmitted to power feed device 100A side, based on the supply start signal input from vehicle-side operation unit 151, and the frequency difference input from frequency difference calculator 1533.

Specifically, power supply permission determination unit 1534 compares a threshold corresponding to any one of power supply coil 104a and power reception coil 154a with a frequency difference that is read and input from vehicle-side storage unit 156. If the frequency difference is the threshold or more, the power reception enable signal is generated and is transmitted to power feed device 100A (specifically, power supply-side communication unit 101A) through vehicle-side communication unit 155.

When the frequency difference input from frequency difference calculator 1533 is less than the threshold, power supply permission determination unit 1534 causes vehicle-side communication unit 155 to generate the power reception disable signal (power supply non-permission signal), and to transmit the signal to power feed device 100A (specifically, power supply-side communication unit 101A).

In vehicle controller 153A, frequency characteristic acquisition unit 1531 calculates the power supply efficiency, based on the power supplied from the supplying side and the frequency at that time, and the reception power of power receiving unit 154. Next, peak determination unit (resonance frequency specifying unit) 1532 specifies the resonance frequency, based on the calculated frequency characteristic of the power supply efficiency of power supply coil 104a. Next, frequency difference calculator 1533 calculates a frequency difference between the specified resonance frequencies. In addition, power supply permission determination unit 1534 determines permission or non-permission of power supply to power reception coil 154a, based on the calculated frequency difference, and outputs the result to vehicle-side communication unit 155. Vehicle-side communication unit 155 generates a power reception enable signal and a power reception disable signal in response to a result of power supply permission determination unit 1534, and transmits the generated signals to power feed device 100A, and power feed device 100A performs a process in response to the received signal.

According to the second exemplary embodiment, vehicle 150A side determines possibility of the power supply from power supply coil 104a to power reception coil 154a, based on the frequency difference between the resonance frequencies. Thus, it is possible to reliably perform power supplying in a state where power supply coil 104a and power reception coil 154a are opposed to each other, and to reduce unnecessary radiation noise. In addition, it is possible to obtain an effect that prevents adverse effects on human bodies and prevents interference to peripheral equipment, due to the reduction of unnecessary radiation noise.

INDUSTRIAL APPLICABILITY

A power feed device according to the invention is preferable to supply power to a storage battery mounted in a vehicle, through a power receiving unit of the vehicle.

The invention claimed is:

1. A power feed device that supplies power to an external power reception coil, by using electromagnetic action, the power feed device comprising:
a power supply coil that supplies power by using the electromagnetic action;
a frequency characteristic acquisition unit that acquires frequency characteristics associated with the power supply coil; and
a resonance frequency specifying unit that specifies a plurality of resonance frequencies, based on the frequency characteristics,
wherein the external power reception coil is configured to be mounted on a vehicle,
wherein the power feed device is configured to supply power to a storage battery mounted on the vehicle via the external power reception coil,
wherein the power feed device acquires a residual capacity of the storage battery from the vehicle, calculates a first frequency difference between the plurality of resonance frequencies, and corrects the first frequency difference to a second frequency difference based on the residual capacity of the storage battery, and
wherein the power feed device determines whether or not to supply power to the power reception coil, based on the second frequency difference corrected from the first frequency difference.

2. The power feed device of claim 1,
wherein the second frequency difference is a product of the first frequency difference and a correction factor.

3. The power feed device of claim 1,
wherein when the number of resonance frequencies is two, if the second frequency difference is a threshold or more, the power feed device determines to supply power to the power reception coil.

4. The power feed device of claim 1,
wherein when the number of resonance frequencies is three or more, if the second frequency difference between any two resonance frequencies is a threshold or more, the power feed device determines to supply power to the power reception coil.

5. The power feed device of claim 1,
wherein the resonance frequency specifying unit acquires reception power information including a value of reception power of the power reception coil, and specifies a resonance frequency of the power supply coil, based on a value of supplying power of the power supply coil and the reception power information.

6. The power feed device of claim 1,
wherein the resonance frequency specifying unit specifies a frequency with a maximum value, based on the frequency characteristics, as a resonance frequency.

7. The power feed device of claim 1, further comprising:
a power supply unit that supplies an alternating current (AC) power to the power supply coil, while varying a drive frequency,
wherein the frequency characteristic acquisition unit acquires frequency characteristics of a current value associated with a current flowing through the power supply coil, or frequency characteristics of a voltage value associated with a voltage applied to the power supply coil, at a time when receiving the supplied AC power, as frequency characteristics associated with the power supply coil.

8. The power feed device of claim 7,
wherein the current value associated with the current flowing through the power supply coil is a value of a current flowing to the power supply coil, an input current value of an AC/DC converter that converts an electrical energy supplied from an external AC power source into a direct current (DC) electrical energy, and supplies the DC electrical energy to the power supply unit, or an output current value of the AC/DC converter.

9. The power feed device of claim 7,
wherein the voltage value associated with the voltage applied to the power supply coil is a voltage value of the power supply coil, or an output voltage value of an AC/DC converter that converts an electrical energy supplied from an external AC power source into a DC electrical energy, and supplies the DC electrical energy to the power supply unit.

10. A power reception device to which power is supplied from an external power supply coil, by using electromagnetic action, the power reception device comprising:
a power reception coil to which power is supplied from the power supply coil by using the electromagnetic action;
a frequency characteristic acquisition unit that acquires frequency characteristics of power supply efficiency between the power supply coil and the power reception coil; and
a resonance frequency specifying unit that specifies a plurality of resonance frequencies based on the frequency characteristics, wherein the power reception device is configured to be mounted on a vehicle, wherein the power reception coil is configured to supply power to a storage battery mounted on the vehicle, wherein the power reception device acquires a residual capacity of the storage battery from the vehicle, calculates a first frequency difference between the plurality of the resonance frequencies, and corrects the first frequency difference to a second frequency difference based on the residual capacity of the storage battery, and wherein the power reception device determines whether or not to supply power to the power reception coil, based on the second frequency difference corrected from the first frequency difference.

11. The power reception device of claim 10, wherein the second frequency difference is a product of the first frequency difference and a correction factor.

12. A power feed method for a power feed device that supplies power to an external power reception coil, by using electromagnetic action, the power feed device comprising: a power supply coil that supplies power by using the electromagnetic action; a frequency characteristic acquisition unit that acquires frequency characteristics associated with the power supply coil; and a resonance frequency specifying unit that specifies a plurality of resonance frequencies, based on the frequency characteristics, the external power reception coil configured to be mounted on a vehicle, the power feed device configured to supply power to a storage battery mounted on the vehicle via the external power reception coil, wherein the power feed device acquires a residual capacity of the storage battery from the vehicle, calculates a first frequency difference between the plurality of the resonance frequencies, and corrects the first frequency difference to a second frequency difference based on the residual capacity of the storage battery, and the power feed device determines whether or not to supply power to the power reception coil, based on the second frequency difference corrected from the first frequency difference.

13. The power feed method of claim 12, wherein the second frequency difference is a product of the first frequency difference and a correction factor.

14. The power feed method of claim 12, wherein when the number of resonance frequencies is two, if the frequency difference between the resonance frequencies is a threshold or more, it is determined to supply power to the power reception coil.

* * * * *